United States Patent [19]
Bodine

[11] 4,393,830
[45] Jul. 19, 1983

[54] ACOUSTIC DETONATION SUPPRESSION IN A CATALYTIC ENVIRONMENT IN INTERNAL COMBUSTION ENGINE

[76] Inventor: Albert G. Bodine, 7877 Woodley Ave., Van Nuys, Calif. 91406

[21] Appl. No.: 929,165

[22] Filed: Jul. 28, 1978

[51] Int. Cl.³ .................... F02B 27/00; F02B 51/02
[52] U.S. Cl. ................................. 123/272; 123/254; 123/285; 123/660
[58] Field of Search ........... 123/191 R, 191 A, 191 B, 123/191 S, 191 SP, 143 R, 30 A, 254, 285, 270–272, 660

[56] References Cited
U.S. PATENT DOCUMENTS

| | | | |
|---|---|---|---|
| 1,159,341 | 11/1915 | Hobart et al. | 123/30 A |
| 2,106,914 | 1/1938 | L'Orange | 123/191 A |
| 2,573,536 | 10/1951 | Bodine | 123/191 B |
| 3,481,317 | 12/1969 | Hughes | 123/143 R |
| 4,114,567 | 9/1978 | Burton | 123/143 R |

*Primary Examiner*—Craig R. Feinberg
*Attorney, Agent, or Firm*—Edward A. Sokolski

[57] ABSTRACT

A screw-in device forming an acoustical resonance absorber cavity is connected in acoustical communication with a combustion chamber of an internal combustion engine. The absorber cavity has catalytic material therein. The absorber cavity operates to acoustically attenuate or damp the detonation of the combustion with the catalytic material operating to facilitate the combustion in the combustion chamber.

14 Claims, 11 Drawing Figures

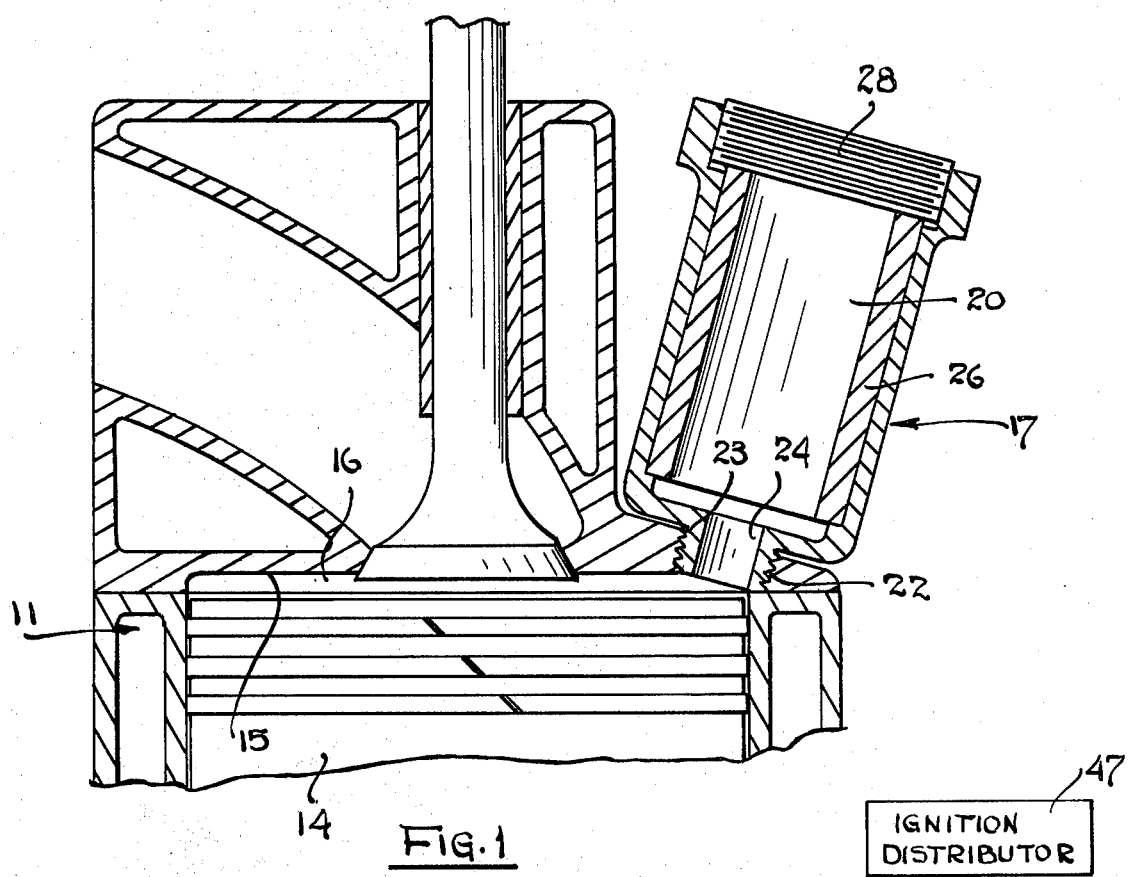
FIG. 1
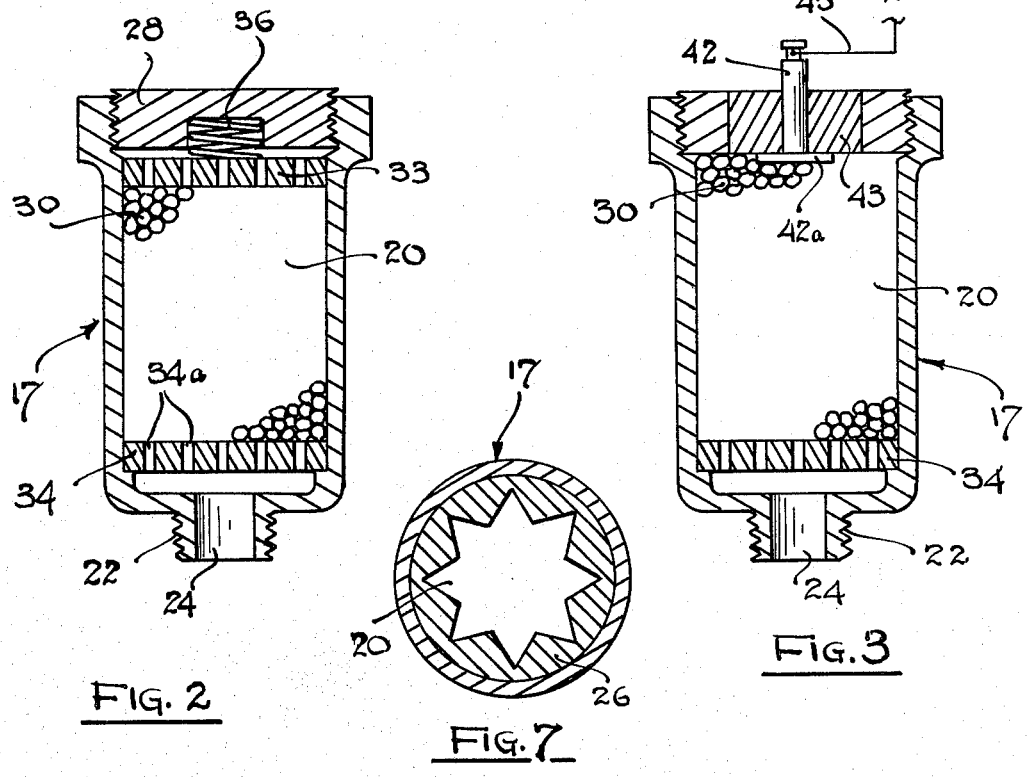
FIG. 2
FIG. 7
FIG. 3

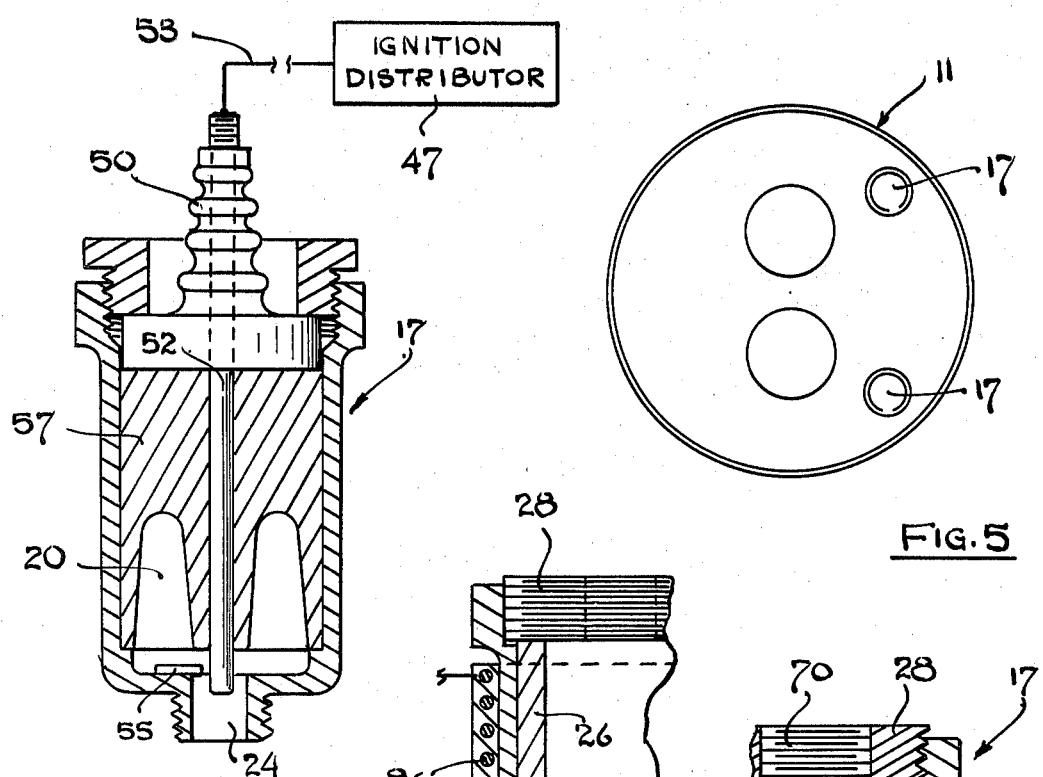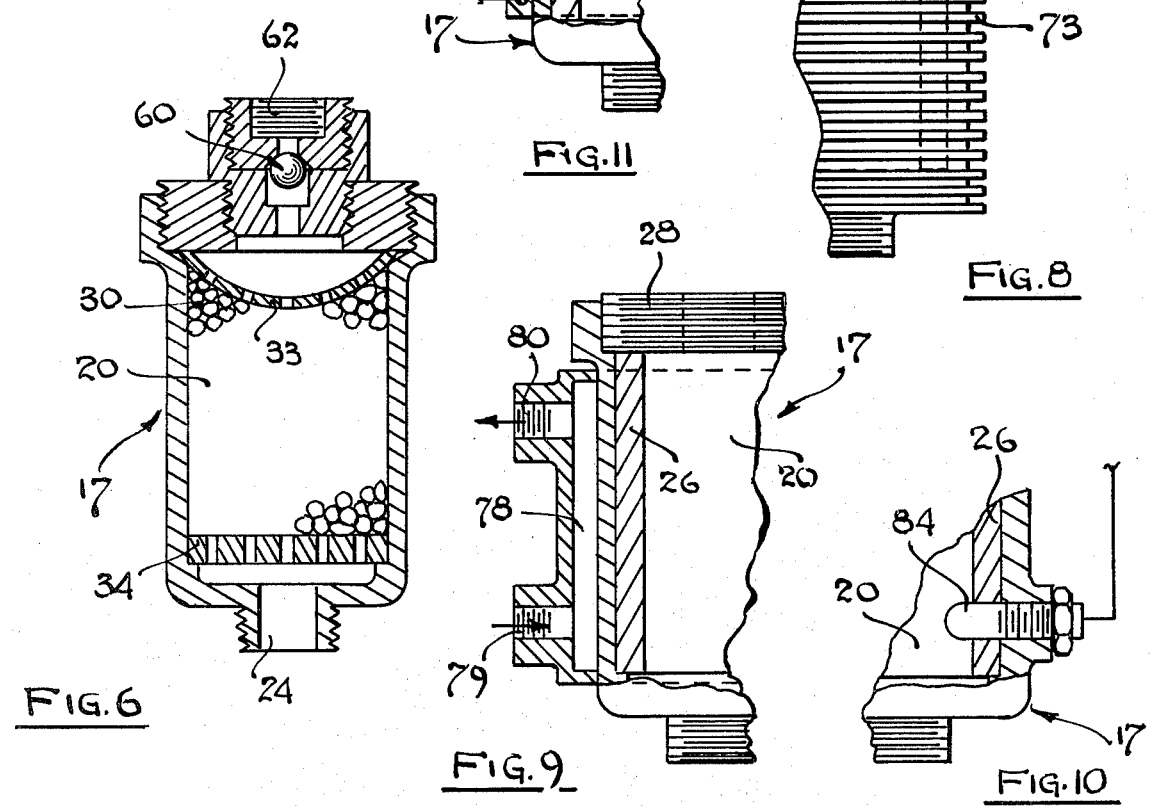

ACOUSTIC DETONATION SUPPRESSION IN A CATALYTIC ENVIRONMENT IN INTERNAL COMBUSTION ENGINE

This invention relates to combustion in internal combustion engines, and moe particularly to apparatus and a technique for acoustically damping the detonation waves generated in combustion and concurrently catalytically improving the combustion process.

In the operation of internal combustion engines, due to such factors as improper spark advance, inferior fuel, high power loading, improper operation, too high a compression ratio for available fuels, hot carbon deposits, or other reasons, irregularities of combustion occur which result in undesirable detonations which not only cause unsatisfactory engine performance, but also can cause damage to the engine. Acoustical methods and apparatus for suppressing such detonation waves to overcome this problem are described in my U.S. Pat. Nos. 2,573,536 and 2,752,907. One of the methods and apparatus described in the aforementioned patents involves the use of screw-in units forming resonant absorber cavities which effectively operate to damp or "spoil" the acoustical energy developed in the combustion chamber. Such cavities may be dimensioned so that they form quarter wave resonators (or resonators which are odd multiples of a quarter wave) at the wave length of the principal detonation wave. The combustion roughness associated with detonation is concomitant with pressure fluctuations involving peak pressures and temperatures considerably above the mean effective values. These temperature peaks cause the dissociation of reacting (combustion) components as well as resulting in the activation of nitrogen, such that the undesirable formation of the air polluting oxides of nitrogen are significantly increased by the gas vibration, as noted in a paper by Seagrave, Reamer and Sage entitled *Oxides of Nitrogen in Combustion: Oscillatory Combustion at Elevated Pressure*, published at the California Institute of Technology, July 1964. Such dissociation of combustion products resulting from combustion roughness, or gas vibration (detonation) in the combustion chamber are thus a significant source of air pollution.

The apparatus and techniques of the present invention provide a significant improvement over the apparatus and techniques of my aforementioned prior patents in combining detonation suppression along with catalytic action to not only ameliorate the effects of detonation but also to give complete combustion along with better power, fuel economy and less pollutants. By placing the catalyst in the combustion chamber rather than in the muffler, where it now generally is located, combustion can be aided at a point where such aid can do the most good, that is right within the combustion chamber. The acoustic damping keeps the combustion aided by the catalytic effect from reaching too high a level, which might otherwise increase to an uncontrolled unacceptable point. This enables the use of conventional catalytic material right in the combustion chamber which otherwise would not be feasible were the combustion not so controlled and limited. Thus, the use of acoustic damping in conjunction with catalyzing right in the combustion chamber operates synergistically to afford unexpectedly improved results.

It is therefore an object of this invention to improve the combustion in an internal combustion engine.

It is a further object of this invention to enable the use of a catalyst for improving engine combustion and lowering pollutants right in the combustion chamber.

It is a further object of this invention to concomitantly lessen engine detonation and improve combustion in an internal combustion engine.

Other objects of this invention will become apparent as the description proceeds in connection with the accompanying drawings of which:

FIG. 1 is a cross-sectional view illustrating a first embodiment of the invention as incorporated into an engine combustion chamber;

FIG. 2 is a cross-sectional view of a screw-in unit of a second embodiment of the invention;

FIG. 3 is a cross-sectional view of a screw-in unit of a third embodiment of the invention;

FIG. 4 is a cross-sectional view of a screw-in unit of a fourth embodiment of the invention;

FIG. 5 is a cross-sectional view illustrating the installation of a plurality of screw-in units of the invention in a single combustion chamber;

FIG. 6 is a cross-sectional view of a screw-in unit of a fifth embodiment of the invention;

FIG. 7 is a cross-sectional view illustrating a convoluted inner surface which may be employed in the screw-in units of the invention;

FIG. 8 is a cross-sectional view illustrating the use of cooling fins and an inlet for fuel injection in the screw-in units of the invention;

FIG. 9 is a cross-sectional view illustrating the use of a cooling jacket in the screw-in units of the invention;

FIG. 10 is a cross-sectional view illustrating the addition of a glow plug for use in cold engine start-ups in the screw-in units of the invention; and FIG. 11 is a cross-sectional view illustrating the use of an electric heat coil in the screw-in units of the invention for cold engine start-ups.

Briefly described, the technique and device of my invention is as follows:

A screw-in unit may be screwed into a wall of the combustion chamber of an internal combustion engine, this unit having a resonance absorber cavity formed therein which is in acoustical communication with the interior of the combustion chamber. This acoustical absorber is dimensioned so as to have an acoustical damping effect at the principal detonation frequencies which can be expected to occur in the combustion chamber. The resonator cavity may have its wall lined with acoustical damping material, e.g. a suitable ceramic, metallic ceramic, or a sintered metal material such as described in my aforementioned patents; or in the alternative, may have pellets or a solid porous piece of such material contained therein. The lining, pellets or solid material, within the chamber are coated with a catalytic material such as platinum, rhodium, etc. In certain embodiments of the invention, an ignition spark synchronized with the cycle of the associated combustion chamber, is provided in the absorber cavity so as to facilitate combustion in conjunction with the catalytic material. The acoustical resonance absorber damps of attenuates the detonation waves generated with combustion and thereby keeps the temperature within the damper cavity and combustion chamber within reasonable limits so as to enable the effective action of the catalyst right within the combustion chamber so as to efficiently facilitate combustion.

Referring now to FIG. 1, a cross-sectional view illustrating one embodiment of the invention installed in the combustion chamber of an engine cylinder is shown. The cylinder 11 is shown with its piston 14 in its top dead center or peak combustion condition. It is to be noted that the piston is arranged to approach very closely to the cylinder head 15 so that much of the combustion space volume is in the ante-chamber provided by cavity 20 which is formed by screw-in unit 17.

Screw-in unit 17 is threadably supported on the top wall of cylinder 11 by means of threaded base portion 22 thereof which threadably engages threaded portion 23 of the cylinder wall. Fluid communication is provided between cavity 20 and the main combustion chamber 16 of the cylinder through the neck portion 24 of unit 17. The inner wall of chamber 20 has a cylindrical liner 26 installed therein, this liner being held in place by means of clamp nut 28 which threadably engages the top portion of unit 17. Liner 26 is made of a porous material such as a suitable ceramic, metallic ceramic, or a sintered metal material which is capable of attenuating acoustical energy at the detonation frequencies encountered in the combustion chamber, as described in my aforementioned patents. Liner 26 is coated with a layer of catalytic material such as platinum or rhodium. The dimensions of cavity 20 are such as to provide damping of resonance at the wavelength of the principal detonation frequencies, which operates to efficiently attenuate the acoustical energy at these frequencies. The catalytic material functions to augment the combustion. In view of the attenuation of the acoustical energy by means of the damper cavity, combustion roughness is suppressed, and the temperature in the chamber is kept from rising so high as to either destroy or prevent the effective operation of the catalytic material. At the same time the attenuation of the acoustical energy lessens the formation of pollutants in the combustion process. The cross-sectional area and length of communicating neck portion 24 may be adjusted to enable this portion to function as a Helmholtz resonator to further aid in the attenuation of the undesired acoustical frequencies in the manner described in my aforementioned patents.

Referring now to FIG. 2, a second embodiment of a plug-in or screw-in unit 17 of the invention is shown. This second unit differs from the first in that rather than having a porous liner coated with catalytic material, it employs pellets 30 which may be fabricated of a porous material such as a suitable porous ceramic or metallic-ceramic, such as for example aluminum oxide, these pellets being coated with a suitable catalytic material such as platinum or rhodium. The numerous pellets make porosity less necessary. Pellets 30 are held in cavity 20 between perforated plates 33 and 34, plate 33 being spring-loaded against the pellets by means of spring 36 which is mounted in a receptacle formed in clamp nut 28. The size of pellets 30 and their density of packing and volume are selected to provide the desired acoustical attenuation, and, as for the first embodiment, the dimensions of cavity 20 are also chosen for optimum attenuation of the detonation frequencies. Pellets 30 are tightly held against the inner walls of chamber 20, and between plates 33 and 34 by virtue of the action of spring 36.

The size and thickness of plate 34 as well as the size and number of the apertures 34a therein are designed so as to quench any premature flame that would tend to issue from ante-chamber 20 into the main combustion chamber that might cause preignition in the main combustion chamber. This can be important in engines having an explosive mixture in the portion of the main combustion chamber above the piston. It is again to be noted that the damping of the gas vibrations provided by the acoustical attenuation greatly reduces the amount of combustion heat that is scrubbed into the catalytic material, thus enabling the catalyst to run cooler. This enables more efficient operation of the catalyst and tends to avoid the development of very high temperatures which could destroy or neutralize the catalytic material. It is also to be noted that with lower temperature, less expensive catalysts can be employed.

Referring now to FIG. 3, a further embodiment of the invention is illustrated. This embodiment is similar to that of FIG. 2 in that it employs pellets 30 contained within chamber 20 which are coated with a catalytic material. However, in this embodiment means are added for facilitating the ionization of the gases within chamber 20 which facilitates the combustion thereof in synchronization with the combustion of the gases in the main combustion chamber. This end result is achieved by means of electrode 42, which is mounted in electrical insulator disc 43, which in turn is mounted in clamp nut 28. Electrode 42 has a disc shaped portion 42a within chamber 20 and is connected by means of ignition lead 45 to the distributor lead of ignition distributor 47 for the spark plug of the cylinder with which the device is operated. In this manner, the synchronized high voltage electrical ionizing voltage is provided to cntrollably initiate the timing of the combustion within antechamber 20.

Referring now to FIG. 4, still a further embodiment of the invention is shown. This embodiment is similar to that of FIG. 3 in that it provides ignition timing of the combustion in ante-chamber 20, but employs conventional spark plug action in igniting the gas within the ante-chamber. This end result is achieved by means of a center electrode 52 which is embedded in a ceramic insulator 50 in the manner of a conventional spark plug. Electrode 52 is connected by means of ignition lead 53 to the output of ignition distributor 47 associated with the cylinder to which the device is connected. A grounded electrode 55 is provided to form a spark gap with electrode 52.

Insulator 50 is retained in chamber 20 in abutment against a plug 57 of porous acoustical attenuating material made of a suitable porous ceramic such as aluminum oxide, which is coated with catalytic material. In this embodiment, the synchronized high voltage impulse fed to electrode 52 generates an ignition spark in the gap to effect the ignition of combustion in cavity 20 in synchronization with the cycle in the main combustion chamber. The same considerations as for the previous embodiment are employed in the acoustical design both dimensionally and in the choice of material of plug 57 for the embodiment of FIG. 4.

Referring now to FIG. 5, a schematic view is shown illustrating how a plurality of the attenuator-catalytic units 17 of the invention can be installed in each cylinder 11. In this illustrative example, a pair of such units are installed spaced from each other at approximately a 90° angle through the central axis of the cylinder so as to increase the chances of operating on the acoustic mode variations encountered in the combustion chamber as mentioned in my aforementioned U.S. Pat. No. 2,573,536. Where a pair of such units 17 are used, in certain instances it may be desirable to emphasize attenuation in one unit and the catalytic effect in the other.

Referring now to FIG. 6, still a further embodiment of the invention is shown. This embodiment is similar to that of FIG. 2 in that it employs porous pellets 30 which have been coated with catalytic material, which are held within cavity 20 between a pair of perforated plates 33 and 34, plate 33 in this instance being flexible and bowed inwardly to hold the pellets tightly in place. This embodiment principally differs from the previous embodiment in that it employs fuel injection into chamber 20 through ball check valve assembly 60. The fuel injection line of a fuel injection system is fed to inlet 62 such that fuel mixes intimately with air in the presence of the catalyst. The fuel thus provides the function of helping to cool the catalyst and the acoustic attenuator. In lieu of ball valve 60, a conventional fuel injector unit can be employed.

Referring now to FIG. 7, an alternate configuration for the acoustic liner 26 of the embodiment of FIG. 1 is shown in cross-section. In the embodiment of FIG. 7, the liner of acoustic material 26 is convoluted rather than being smooth, to improve the acoustical attenuation effect by providing more acoustic coupling surface as well as more volume in the attenuator material provided in lining 26.

Referring now to FIG. 8, a further modification of the embodiment of FIG. 1 is shown. In this modification, an inlet 70 for a spark plug is shown, along with a second inlet 72 for a fuel injector, enabling the combined use of both of these features. Also, cooling fins 73 for cooling the unit are shown. It is to be noted that with engines having a sufficiently high compression ratio, such as excess air cycle, compression ignition diesel type engines, a spark plug is not needed in view of the fact that the ignition as well as combustion are both aided by the catalytic effect.

Referring now to FIG. 9, a further modification of the embodiment of FIG. 1 is shown. In this modification, a cooling jacket 78 is provided for circulating cooling fluid around unit 17, this cooling fluid being fed to the jacket through inlet 79 and exited therefrom from outlet 80. This is particularly useful with resonance absorbers that are an integral part of the engine rather than a screw-in unit.

For aiding cold engine start-up or running, a conventional glow plug 84 may be installed in the wall of the device as shown in FIG. 10 or, as shown in FIG. 11, an electric heat coil 86 may be placed around the device and energized as may be desired.

While the invention has been described and illustrated in detail, it is to be clearly understood that this is intended by way of illustration and example only and is not to be taken by way of limitation, the spirit and scope of this invention being limited only by the terms of the following claims.

I claim:

1. In an internal combustion engine, having a combustion chamber and an ante-chamber dimensioned to suppress detonation waves generated in said chamber in fluid communication with said combustion chamber, the improvement comprising:
   catalytic means contained in said ante-chamber for facilitating the combustion within said combustion chamber.

2. The engine of claim 1 wherein the ante-chamber forms an acoustical resonator at the wavelengths of said detonation waves.

3. The engine of claim 1 wherein said ante-chamber is screwed into the wall of said combustion chamber.

4. The engine of claim 1 and including a plurality of said ante-chambers connected in fluid communication with said combustion chamber.

5. The engine of claim 1 and further including means for injecting fuel into said ante-chamber.

6. The engine of claim 1 and additionally including a second ante-chamber dimensioned to suppress detonation waves in fluid communication with said combustion chamber, said second ante-chamber not having catalytic means contained therein.

7. The engine of claim 1 and further including means for igniting the gas in said ante-chamber in synchronism with the combustion in said combustion chamber.

8. The engine of claim 7 and further including means for injecting fuel into said ante-chamber.

9. The engine of claim 7 wherein the means for igniting the gas comprises an electrode, means for mounting said electrode in said ante-chamber, said engine having an ignition distributor, and means for connecting said electrode to said ignition distributor.

10. The engine of claim 7 and further including means for cooling the walls of said ante-chamber.

11. The engine of claim 1 and further including an acoustical damping material placed in said ante-chamber, the catalytic material being coated on said material.

12. The engine of claim 11 wherein the acoustical damping material is lined on the walls of said ante-chamber.

13. The engine of claim 11 wherein the acoustical material is in the form of pellets contained in said ante-chamber.

14. The engine of claim 13 and further including means for packing the pellets to tightly hold them against the walls of the ante-chamber.

* * * * *